Sept. 15, 1959 R. H. SHEPPARD 2,904,145
TRUMPET ASSEMBLY
Filed May 6, 1954 4 Sheets-Sheet 2

INVENTOR
RICHARD H. SHEPPARD
BY Henry H. Snelling
ATTORNEY

Sept. 15, 1959 R. H. SHEPPARD 2,904,145
TRUMPET ASSEMBLY
Filed May 6, 1954 4 Sheets-Sheet 3

INVENTOR
RICHARD H. SHEPPARD
BY Henry H. Snelling
ATTORNEY

Sept. 15, 1959 — R. H. SHEPPARD — 2,904,145
TRUMPET ASSEMBLY
Filed May 6, 1954 — 4 Sheets-Sheet 4

INVENTOR
RICHARD H. SHEPPARD
BY Henry H. Snelling
ATTORNEY

2,904,145
TRUMPET ASSEMBLY

Richard H. Sheppard, Hanover, Pa.

Application May 6, 1954, Serial No. 427,974

12 Claims. (Cl. 192—4)

This invention relates to tractors and has for its principal object the provision of a trumpet assembly which houses the so-called final pinion and the main axle which drives the large ground wheels on each side of the main body of the tractor and which assures correct alinement of these wheels by distributing the stress and the strain inherent in the parts over a broad area of the center casing by virtue of the wide and deep flanges on the axle trumpets.

A further object of the present invention is to provide brakes in such a location that these may readily be inspected or adjusted by mere removal of a cap on either side, such caps housing the free end of the final pinion shaft which at its inner end is driven by the differential.

A further object of the invention is to provide means whereby the trumpet is bolted at its edges to the main body whereby the gear alinement is preserved with consequent absence of end loading of the teeth.

A still further object of the invention is to provide well spaced bearings in the main axle within the trumpet, these roller bearings cooperating with an additional bearing for the main axle in the main housing of the tractor.

A further object of the invention is to provide a trumpet assembly for each of the two sides of a tractor in which the entire assembly within the trumpet can be slid from engagement with the mechanism within the transmission housing by a single straight movement.

Figure 1:
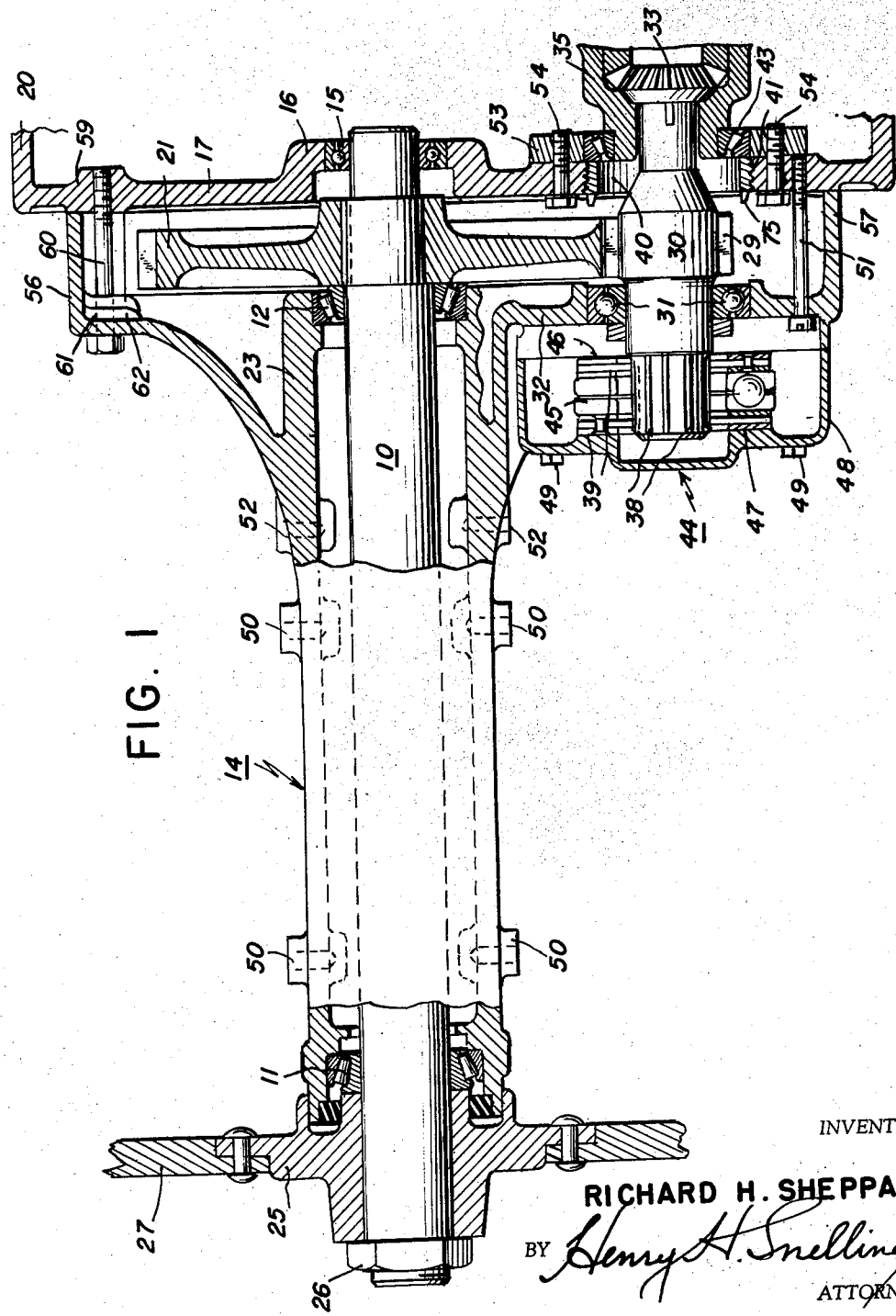
Figure 1 is a plan view of a trumpet assembly.

Referring particularly to Figure 1, the main axle 10 is mounted in roller bearings 11 and 12 in the trumpet 14 and also in bearings 15 in an indented annular projection 16 integral with the wall 17 of the main housing 20 of the tractor. This axle carries the bull gear 21 adjacent the roller bearings 12 which are housed in a hollow cylindrical extension 23 integral with the trumpet 14. At its free end the main axle 10 is splined to a hub 25, secured to the main axle by the nut 26. The hub in usual fashion carries the disk 27 secured to the rim of the ground wheel, not shown.

Figure 2:
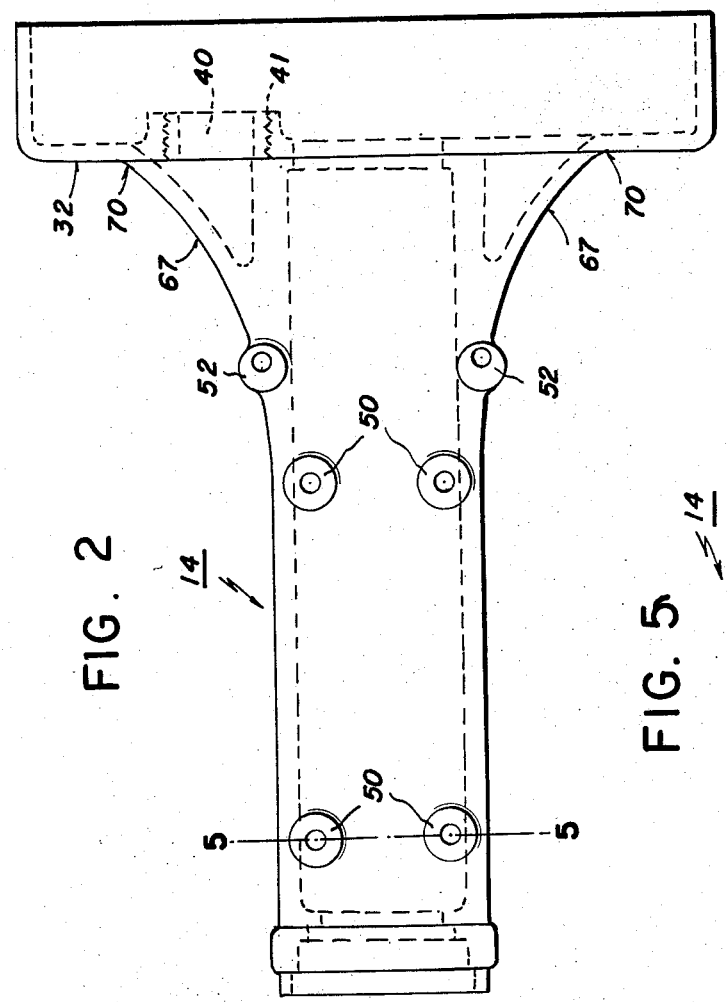
Figure 2 is a rear elevation of the left trumpet.

The bull wheel 21 is driven by teeth 29 of the pinion of the shaft 30, this shaft usually being termed the final drive pinion shaft. It is supported in part by bearings 31 in a wall 32 (Figure 2) of the trumpet parallel to the wall 17 of the main housing 20. At its end toward the longitudinal center line of the tractor, the shaft 30 is splined to a driving bevel pinion 33, receiving power from the transmission and is supported by the ring gear carrier 35 which is positioned axially by rotation of the adjusting ring 40 threaded as at 41 to the wall 17 of the rear casing of the main housing. Rotation of the ring 40 moves the roller bearings 43 so as to insure precise meshing of the ring gear with its drive pinion, not shown. To make the necessary adjustment, the companion adjusting ring on the opposite side (not shown) is backed off somewhat, both trumpets being detached, and then the two rings 40 are carefully revolved forwardly or backward until the ring gear is precisely and exactly centered. Next each of the two plates 72, one on each side, are secured by the screws 73 so that their eccentric slots 77 engage the appropriate lug 75 of the proximate ring 40, thus locking the mechanism in adjusted place. The trumpets are now secured, the usual inner splines of the shafts 30 readily sliding through the circular openings in the ring gear carriers 35 at both sides and into the spline grooves of the bevel pinions 33 which have just been locked in place by the fastening of the adjusting rings which secure the roller bearings.

The brake assembly 44 is of normal configuration consisting of two pairs of disks 39 actuated by a central assembly 45 to exert pressure on the plate 46 and on the surface 47 of the brake case 48 which case merely encloses the brake assembly and provides the friction surface 47. By virtue of its location it may be held by just a few bolts preferably three and by removing these bolts 49 the cap can readily be taken off, exposing the entire brake assembly which is secured to the drive pinion shaft 30 by a series of fine splines 38. The base plate 46 of the brake assembly is secured through the wall 32 of the trumpet to the main housing wall 17 as by the elongated bolt 51 extending into the rear casing wall.

The bosses 50, preferably four on the forward side and four on the rearward side, are tapped for convenient securing of an agricultural instrument as, for example, a cultivator. The bosses 52, two in number on each side, are likewise tapped to secure a shield or fender, one on each trumpet, to protect the driver. The ring 53 secured to the wall 17 of main case 20 is held in place by a dozen bolts 54 and gives the advantage that when the trumpet assembly and these bolts are removed and the adjusting nut 40 is loosened the ring 53 and the ring gear carrier assembly to the right of wall 17 may be removed as a unit by withdrawing it toward the bottom of Figure 1.

Figure 3:
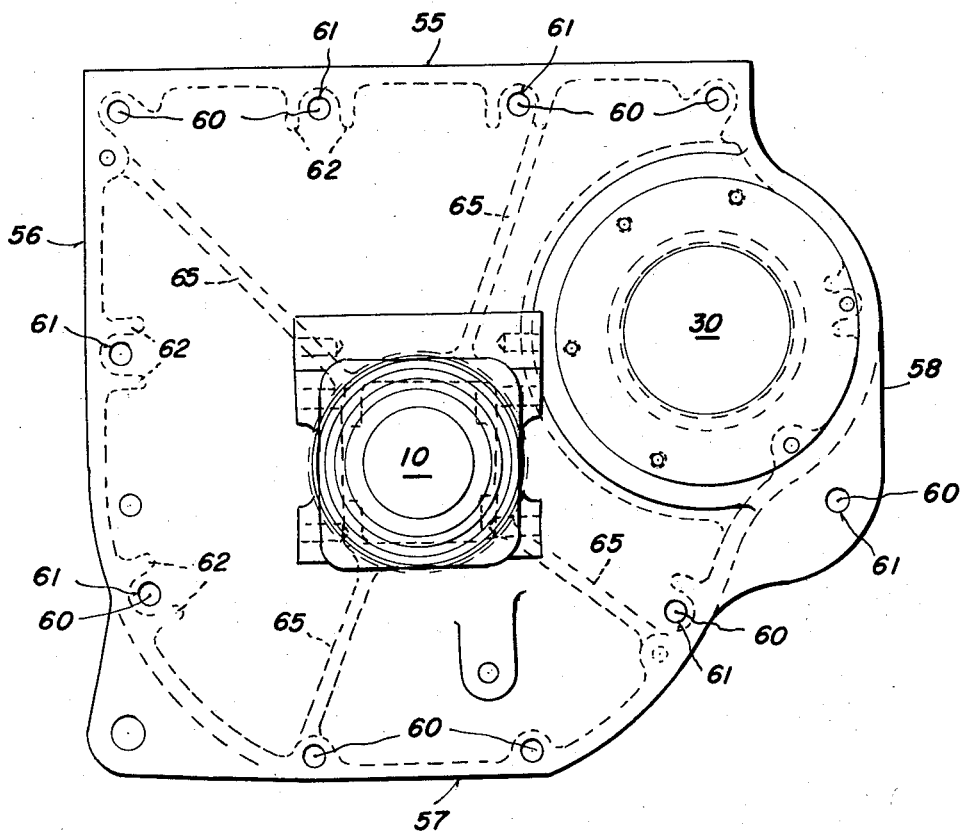
Figure 3 is an end elevation of the trumpet looking toward the main body of the tractor and omitting the wheel hub.

As best seen in Figure 3, the base portion of the trumpet which engages the main tractor housing has a flat upper wall 55, a generally vertical front wall 56, a generally curved bottom wall 57 and a rear wall 58 which is curved rearwardly to accommodate the final pinion shaft 30 and its associated parts. The trumpet is secured to the tractor housing 20 by a considerable number of bolts 60 here shown as four at the top, four at the bottom, and an additional bolt at front and back. It will be noted from Figure 1 that these bolts 60 have their heads on the outside of the trumpet and extend just inside of the shell (front wall 56 for example) of the trumpet and into a tapped boss 59 in the tractor side wall 17. Each bolt hole 61 is spaced in the wall 32 between cast braces 62, this being appreciably cheaper than providing a boss and have the bore through the boss. As noted in Figure 3, this is not always possible particularly where the ribs 65, four in number, run into the periphery of the shallow housing formed by the vertical wall 32, and the relatively narrow enclosing walls 55, 56, 57 and 58.

Figure 5:
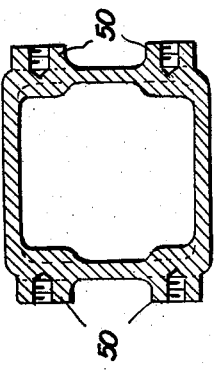
Figure 5 is a section on line 5—5 of Figure 2.

Between the four bosses 50 (Figure 2) the trumpet is roughly square in cross section, as seen in Figure 5, but at its end adjacent the ground wheel hub 25 the trumpet is cylindrical, as it is where it supports the bearings 12. Between the bosses 52 and the outer generally flat wall 32 forming the outside of the bull gear housing, the trumpet flares as at 67 to a point 70. Within this flaring portion of the trumpet and integral with such bell shaped portion there is a coaxial cylindrical extension 23 carrying the roller bearings 12.

Figure 4:
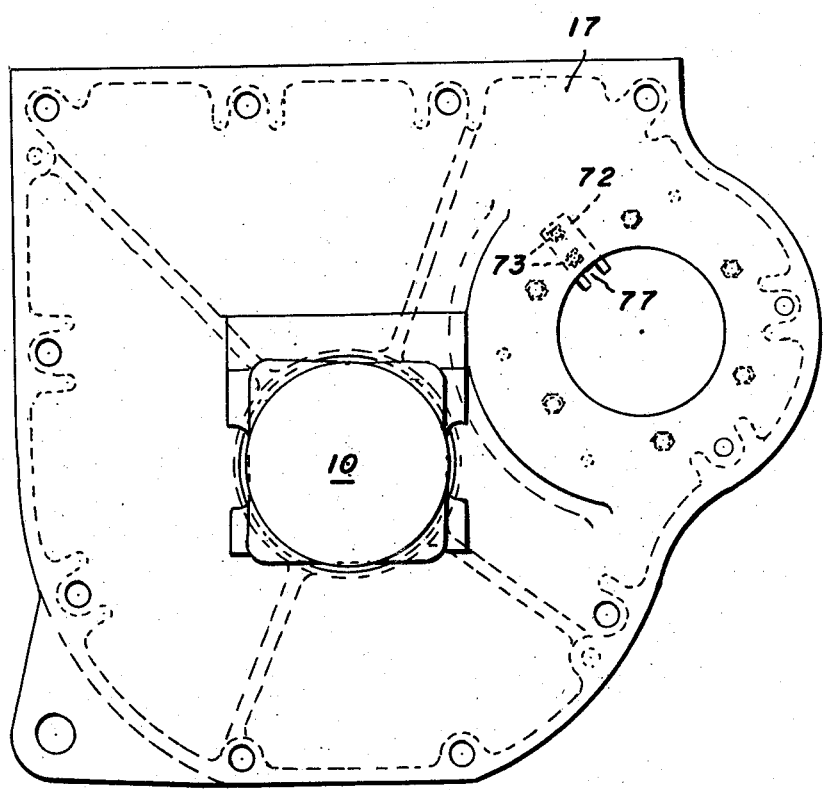
Figure 4 is a side elevation of the rear case.

The adjusting ring 40 has a series of equispaced lugs 75 which extend into the large chamber of the trumpet. When this ring has been adjusted to correct position it is locked in place by a flat plate 72 (Fig. 4) having a slot 77 to receive the proximate lug of the ring. By positioning either the slot 77 or the line of screws 73 in the center line of the plate and having the other laterally offset by a distance equal to half the space between the lugs 75 on the adjusting ring 40, adjustment of the ring 40 may be had by turning the plate 72 over, if necessary this giving the advantage of positioning the ring within half the space between adjacent lugs 75. It will be understood that there is a trumpet on the opposite side of the tractor so that the two axles 10 and the two pinion shafts 30 are alined and that the two adjusting rings 40 will simultaneously be adjusted to position the centrally located ring gear assembly in exact position and that this is done without in any way shifting either of the pinion shafts 30 axially.

What I claim is:

1. In a tractor, a main casing, an axle for driving a ground wheel, a bull gear on said axle, a trumpet housing the bull gear and the axle, a bearing on each side of the bull gear, one bearing within the trumpet and the other bearing in the main casing, an additional bearing proximate the outer end of the trumpet to support the axle, said additional bearing and the bearing in the trumpet supporting the axle when the trumpet is removed from the main casing, and a series of bolts spaced radially beyond the periphery of the bull gear and completely surrounding the bull gear to secure the trumpet to the main casing so that the trumpet may readily be removed from the main casing as a unit with the axle supported therein, whereby the trumpet when fast to the main casing distributes stress and strain over a broad area and thereby assures continual correct alinement of the bull gear axle.

2. In a tractor, a main casing, an axle for driving a ground wheel, a bull gear on said axle, a trumpet housing the bull gear and the axle, a bearing on each side of the bull gear, one bearing within the trumpet and the other bearing in the main casing, an additional bearing proximate the outer end of the trumpet to support the axle, a series of securing means spaced radially beyond the bull gear for detachably fastening the flaring portion of the trumpet to the main casing for ready removal as a unit, whereby the trumpet when fast to the main casing distributes stress and strain over a broad area and thereby assures continual correct alinement of the bull gear axle, said axle being slidable from its bearing in the main casing when the trumpet is removed from the main casing and is supported by its two bearings in the trumpet.

3. The device of claim 1 in which the flaring portion of the trumpet is smoothly curved and is integral with a narrow wall parallel to the axis of the axle and normal to the wall of the main casing to which the trumpet is secured, one of said bearings is mounted in a cylindrical extension of the trumpet at its flaring end and the axes of the bolts are parallel to the axle.

4. In a tractor, a main casing, an axle for driving a ground wheel, a bull gear on said axle, a trumpet housing the bull gear and the axle, a bearing on each side of the bull gear, one bearing within the trumpet and the other bearing in the main casing, an additional bearing proximate the outer end of the trumpet to support the axle, a series of securing means spaced radially beyond the bull gear for detachably fastening the flaring portion of the trumpet to the main casing for ready removal as a unit, whereby the trumpet when fast to the main casing distributes stress and strain over a broad area and thereby assures continual correct alinement of the bull gear axle, the trumpet is secured to a substantially vertical wall of the main casing and the flaring portion of the trumpet includes a narrow wall perpendicular to the wall of the casing and forming the margin of a chamber housing the bull gear, and the securing means are spaced from said narrow wall.

5. The device of claim 4 in which the securing means includes a plurality of bolts passing thru a flaring wall of the trumpet which at the end of the flare is substantially parallel to the vertical wall of the main casing and the bolts extend into said vertical wall and are parallel to the narrow wall of the trumpet.

6. In a tractor, a ground wheel axle, a bull gear mounted on said axle, a shaft carrying a pinion meshing with said bull gear and having splines adapted to accommodate a driving pinion, a main housing wall carrying a bearing for said ground wheel axle, a trumpet housing detachably secured to said main housing wall and having a plurality of additional spaced bearings for the ground wheel axle to hold same parallel to said shaft, a ring gear carrier member coaxial with and surrounding said pinion shaft, a roller bearing between the housing wall and the ring gear carrier member, an adjusting nut having a sliding engagement with the roller bearing and having threaded engagement with the housing wall for rotating the adjusting nut to move the roller bearing axially of the pinion shaft to shift the ring gear carrier member axially with respect to the main housing wall without moving the pinion shaft axially.

7. The device of claim 6 in which the adjusting nut carries a plurality of equally spaced projections, and a plate is detachably secured to the housing wall and having means to engage a chosen one of said projections to lock the nut in a chosen adjusted position.

8. The device of claim 7 in which the means for securing the plate to the housing wall includes a plurality of screws mounted parallel to but spaced from the centerline of the plate, the plate has a central recess to engage a projection whereby when the plate is detached and then refastened with its opposite parallel side against the main housing wall, a closer adjustment of the adjusting nut by half the space between adjacent projections may be obtained.

9. A one-piece side member for a tractor to house the main axle, the pinion shaft and the bull gear for driving the main axle; comprising a tubular member housing the main axle, a member forming a chamber to house the bull gear, a flaring member connecting the tubular member and the chamber member, a cylindrical extension of the tubular member within the flaring member to support a bearing for the main axle, said chamber member including a narrow flange constantly parallel to the axis of the tubular member, being generally cylindrical at rear, bottom, and lower front, and having a vertical upper front portion.

10. The one-piece side member of claim 9 with a main axle and bearings for supporting the axle, one bearing being proximate the end of the tubular member and the other bearing positioned in the end of the cylindrical extension, said axle extending beyond the side member at one end to support a ground wheel and extending beyond the one-piece side member at the other side to enter a bearing in the main casing of the tractor.

11. In a tractor, a main casing having in a side wall a bearing and an aperture spaced therefrom, a trumpet detachably secured to the side wall and having a main axle mounted therein to extend into and be supported in said bearing when the trumpet is secured to the casing, a bull gear mounted on the main axle within the trumpet, a driving shaft extending through the aperture and carrying a pinion meshing with said bull gear, said shaft being splined at both ends, receiving beyond the said aperture and within the main casing a bevel pinion and receiving at its other end inside of the trumpet a braking mechanism, a bearing in the trumpet for supporting one end of the main axle, and a series of bolts extending through the trumpet into the side wall and surrounding the bull gear to serve to detachably secure the trumpet to the side wall.

12. The tractor of claim 11 in which the pinion shaft has one bearing in the trumpet and another bearing in a ring gear carrier member coaxial with the aperture and slidable axially of the pinion shaft and of the side wall, and an adjusting means having threaded engagement with the aperture wall for shifting said member axially.

References Cited in the file of this patent

UNITED STATES PATENTS

| | | |
|---|---|---|
| 2,252,355 | Scarratt | Aug. 12, 1941 |
| 2,546,969 | Buckendale | Apr. 3, 1951 |
| 2,548,258 | Griffith | Apr. 10, 1951 |
| 2,563,680 | Hoffman | Aug. 7, 1951 |
| 2,601,553 | Nordenson | June 24, 1952 |